United States Patent [19]
Nishimura

[11] Patent Number: 5,303,041
[45] Date of Patent: Apr. 12, 1994

[54] SPECIAL EFFECTS GENERATOR WITH KEY SIGNAL MOTION DETECTION

[75] Inventor: Kazuhisa Nishimura, Tokyo, Japan

[73] Assignee: Sony Corporation, Tokyo, Japan

[21] Appl. No.: 981,314

[22] Filed: Nov. 25, 1992

[30] Foreign Application Priority Data

Nov. 30, 1991 [JP] Japan .................... 3-342333

[51] Int. Cl.$^5$ ............................ H04N 5/262
[52] U.S. Cl. ...................... 348/590; 348/594; 348/595
[58] Field of Search ........... 358/22 CK, 22, 183, 358/182, 105

[56] References Cited

U.S. PATENT DOCUMENTS 5,043,800 8/1991 Snashall et al. .............. 358/22

FOREIGN PATENT DOCUMENTS 0264727 4/1988 European Pat. Off. .
315377 11/1992 Japan .

Primary Examiner—Victor R. Kostak
Assistant Examiner—Nathan J. Flynn
Attorney, Agent, or Firm—William S. Frommer; Alvin Sinderbrand

[57] ABSTRACT

In a special effects apparatus that processes an input video signal in accordance with a key signal representing an image pattern, a processing circuit processes the input video signal in accordance with the key signal and outputs a processed video signal which is stored in a video memory and fed back from the video memory to the processing circuit for further processing of the processed video signal in accordance with the key signal and the input video signal. A motion detection circuit detects motion of the image pattern represented by the key signal and a control circuit prevents the processed video signal from being stored in the video memory when the motion detector does not detect motion in the image pattern so that a desired soft-edged special effect can be maintained when there is no motion of the image pattern represented by the key signal.

5 Claims, 7 Drawing Sheets

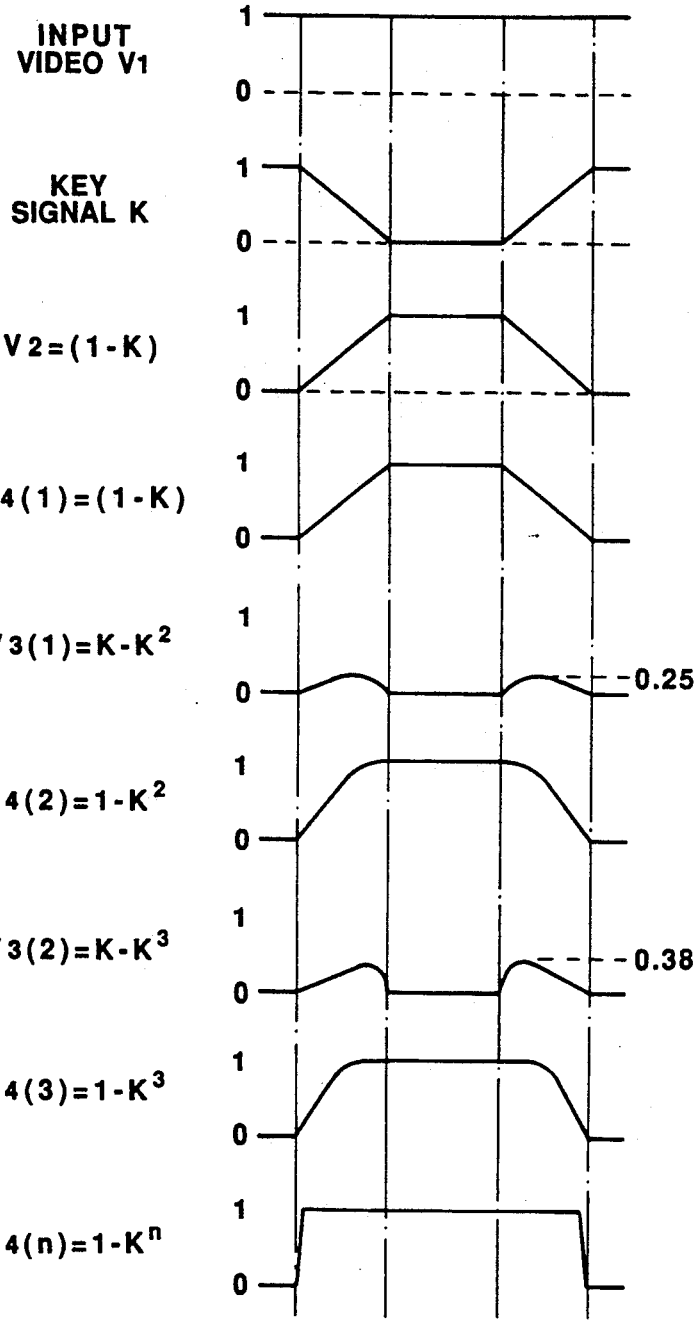

SPECIAL EFFECTS GENERATOR WITH KEY SIGNAL MOTION DETECTION

FIELD OF THE INVENTION

This invention relates to video special effects equipment, and more particularly, to such equipment in which a soft-edged special effect can be produced.

BACKGROUND OF THE INVENTION

A typical arrangement of a video production switching apparatus is schematically illustrated in FIG. 1. In the production switching apparatus of FIG. 1, input video signals are respectively provided to input terminals 50 and 51 from video cameras 1 and 2. A black burst signal is provided to an input terminal 52. Each of the terminals 50, 51 and 52 is connected via cross points to video signal buses A and B. Buses A and B provide the input signals to a mixer/key signal amplifier (MIX/KEY) 55. A key signal generator 54 provides image mixing and changeover control signals to MIX/KEY 55 so that a desired video signal that includes a special effect such as a key or wipe effect is output from MIX/KEY 55. The signal output from MIX/KEY 55 is provided to a superimposing circuit 56 which is also controlled by signals from key signal generator 54 and which receives input character and/or image signals provided at a terminal 53. The character and/or image signals received by superimposing circuit 56 are added as titles and so forth to the video signal output by MIX/KEY amplifier 55 and the resulting signal is supplied to an output signal processing circuit 57. Output signal processing circuit 57 performs waveform shaping of the output signals, which are then provided to output terminals 58 and 59. The output signal at output terminal 58 is transmitted on a main line for broadcasting, while the output signal from output terminal 59 is supplied to the production studio monitor for monitoring the broadcast signal.

In JP Pat. Appln. No. 3-108392, filed on Apr. 13, 1991, and which is commonly assigned with the present application, there is described a special effects apparatus that is capable of conveniently executing complex wipe and mask patterns including effects that give the impression of gradually wiping a clouded glass surface, or of painting a wiped region of a video image so that the image is gradually erased. The special effects apparatus described in Appln. No. 3-108392 is generally illustrated in FIG. 2 and may, for example, be incorporated in MIX/KEY 55 of FIG. 1.

Returning to FIG. 2, the special effects apparatus of the aforesaid Appln. No. 3-108392 includes a key processor 32 and a video memory 37. Key processor 32 includes multipliers 33 and 34 and adders 35 and 36. A key signal K is provided to an input terminal 31 and an input video signal $V_1$ is provided to an input terminal 30.

The value "1" is supplied to one input of adder 35 and the key signal K is applied in a negative sense to the other input of adder 35 so that adder 35 outputs an inverted key signal 1-K, which is the inverse of the key signal K received at input terminal 31. One input of multiplier 33 receives inverted key signal 1-K and the other input of multiplier 33 receives the input video signal $V_1$ which is supplied from input terminal 30. The resulting multiplied signal $V_2$ is provided to an input of adder 36 where it is added to a signal $V_3$ output from multiplier 34. The resulting sum is stored in the video memory 37 from which it is output as output signal $V_4$ under control of a paint control signal supplied to a terminal 39. The signal $V_4$ output from video memory 37 is provided as an output signal at an output terminal 38 and is also fed back to an input of multiplier 34 of key processor 32. Multiplier 34 multiplies the signal $V_4$ fed back from video memory 37 by the key signal K supplied through input terminal 31 to produce the signal $V_3$ which, as mentioned above, is added by adder 36 to the signal $V_2$ output by multiplier 33.

By means of the circuitry of FIG. 2, complicated special effects involving mask patterns, wipe effects and the like can be created in a convenient manner. Referring now to FIG. 3 in combination with FIG. 2, a combined mask pattern such as that shown in FIG. 3 can be created in a multi-step process, in which, for example, first a diamond-shaped mask 23 is used to mask a portion of the image represented by input video signal $V_1$. The resulting image signal is temporarily stored in video memory 37 without being output via terminal 38 and fed back to key processor 32, and then a second, circular mask pattern 24 is added at the location shown in FIG. 3. Again the resulting image is stored in video memory 37 and fed back to key processor 32 without being output via terminal 38. Thereafter, a small square 25, a star 26 and additional small squares 27 and 28 are added as additional mask patterns in respective steps in which the image resulting from the previous step is fed back from memory 37 and further processed in key processor 32. When all of the desired mask patterns have been added, then the final image, with the complicated mask pattern shown on FIG. 3, is output from terminal 38.

According to another mode of operating the circuitry of FIG. 2, a different sort of effect may be realized by continuously outputting the image stored in memory 37 via output terminal 38 while feeding the stored image back to key processor 32 and varying the key signal K applied at input terminal 31. For example, referring now to FIGS. 4A and 4B in combination with FIG. 2, initially a small circular mask pattern 29 is applied to the image and the mask pattern is then expanded and moved as indicated in FIG. 4A until it has the size and is in the location indicated by large circle 30. With continuous feeding back of the image signal stored in memory 37, while the image signal is being output via terminal 38, the resulting output image as shown in FIG. 4B includes not only the final mask pattern 32, but also the initial location of the mask pattern 31 along with all the interim positions and sizes of the mask pattern as it was expanded and moved across the image. Such a continuously varying mask pattern can also be used as a wipe pattern.

FIGS. 5A–5E illustrate a gradual and continuously changing wipe effect that can be created using the circuitry of FIG. 2. In FIG. 5A, the dotted outline 39 of a car indicates a location in the video image in which a car, not yet visible in the image, is to be gradually made visible by a wipe effect. In FIG. 5B, an upper left portion 40 of the car image is gradually made to appear, in the manner, for instance, of wiping a clouded glass, by dynamically changing the configuration of the key signal at each field or frame. Further expansions of the wiped area, for showing more of the car, are indicated at 41 and 42, respectively, in FIGS. 5C and 5D. Finally, in FIG. 5E, the entire car, represented by reference numeral 43, is visible in the image.

Using the apparatus of FIG. 2, a "soft-edge" or a "painting effect" can be achieved in wipe effects such as that shown in FIGS. 5A–5E. Such a "painting effect" provides an attractively smooth or gradual transition, as with fine brush strokes, between a wiped portion of the video image and the balance of the image. This is accomplished by providing, as a key signal K, an analog signal having a level that varies between 0 and 1.

So long as the key signal is moving, as in the examples of FIGS. 4A–4B and 5A–5E, a "painting effect" with a smooth transition between the wiped area of the image and the balance of the image can be maintained. However, as will now be described with reference to FIGS. 6a–6i and also FIG. 2, when the key signal K is stationary, repeated application of the key signal to the signal fed back from video memory 37 causes the gradual, smooth painting effect to be lost and a sharp transition develops between the wiped area and the balance of the image.

In particular, FIGS. 6a and 6b respectively show waveforms for input video signal $V_1$ and key signal K. The waveform of signal $V_2$ output from multiplier 33 is given by the expression $V_2 = V_1 \times (1-K)$ and for present purposes this may be expressed as $(1-K)$, as shown in FIG. 6c. The first frame output as video signal $V_4$ is $V_4(1) = (1-K)$, which is shown in FIG. 6d and represents the desired gradual smooth transition from the wiped area to the balance of the image.

The output signal $V_4(1)$ for the first frame is fed back to multiplier 34 of key processor 32 and multiplied by key signal K to provide a signal $V_3(1) = K - K^2$ (FIG. 6e), having peaks with an amplitude of about 0.25. The signal $V_3(1)$ is summed at adder 36 with $V_2 = (1-K)$ resulting in the output signal $V_4(2) = 1 - K^2$ as shown in FIG. 6f. The next cycle of feedback results in $V_3(2) = K - K^3$ (FIG. 6g), with peaks having an amplitude of about 0.38. $V_2$ is again added to $V_3(2)$ at adder 36, to produce $V_4(3) = 1 - K^3$ which is shown in FIG. 6h. As shown in FIG. 6i, if the feedback cycle continues n times (i.e., over n frames), with n being a relatively large number, the resulting output signal $V_4(n) = 1 - K^n$ results in an image that has a very sharp edge or gradient between the wiped portion of the image and the balance of the image. As a result, the desired gradual and smooth transition is lost. The increasingly sharp transition can be seen by comparing the waveforms of FIGS. 6d, 6f, 6h, and 6i.

OBJECTS AND SUMMARY OF THE INVENTION

Accordingly, it is an object of the present invention to provide a special effects generator in which smooth transitions between a wiped area and the balance of the image can be maintained even in the absence of motion in the key signal.

According to the invention, a special effects apparatus for processing an input video signal in accordance with a key signal that represents an image pattern includes processing means for processing the input video signal in accordance with the key signal and outputting a processed video signal, storage means for storing the processed video signal output from the processing means, means for feeding back the processed video signal from the storage means to the processing means for further processing of the processed video signal in accordance with the key signal and the input video signal, motion detecting means that receives the key signal and detects motion of the image pattern represented by the key signal, and control means responsive to the motion detecting means for selectively preventing the storage means from storing the processed video signal output from the processing means.

According to an aspect of the invention, the control means prevents the storage means from storing the processed video signal when the motion detecting means does not detect motion in the image pattern represented by the key signal.

According to another aspect of the invention, the motion detecting means includes means for detecting changes in position of the image pattern in a horizontal direction, means for detecting changes in position of the image pattern in a vertical direction, and a gate circuit responsive to these means for detecting position changes in the horizontal and vertical directions for supplying a motion detection signal to the control means.

In the foregoing apparatus according to this invention, the undesirable sharpening of the image transition region due to repeated application of a stationary key signal to a fed back processed image signal is prevented so that the desired gradual transition is maintained even when there is no motion in the image pattern represented by the key signal.

The above, and other objects, features and advantages of the present invention will be apparent from the following detailed description thereof which is to be read in connection with the accompanying drawings.

BRIEF DESCRIPTION OF THE DRAWINGS

FIGS. 6a–6i are waveform diagrams of signals that are present during certain operations of the circuitry of FIG. 2;

DETAILED DESCRIPTION OF THE PREFERRED EMBODIMENT

Figure 1:
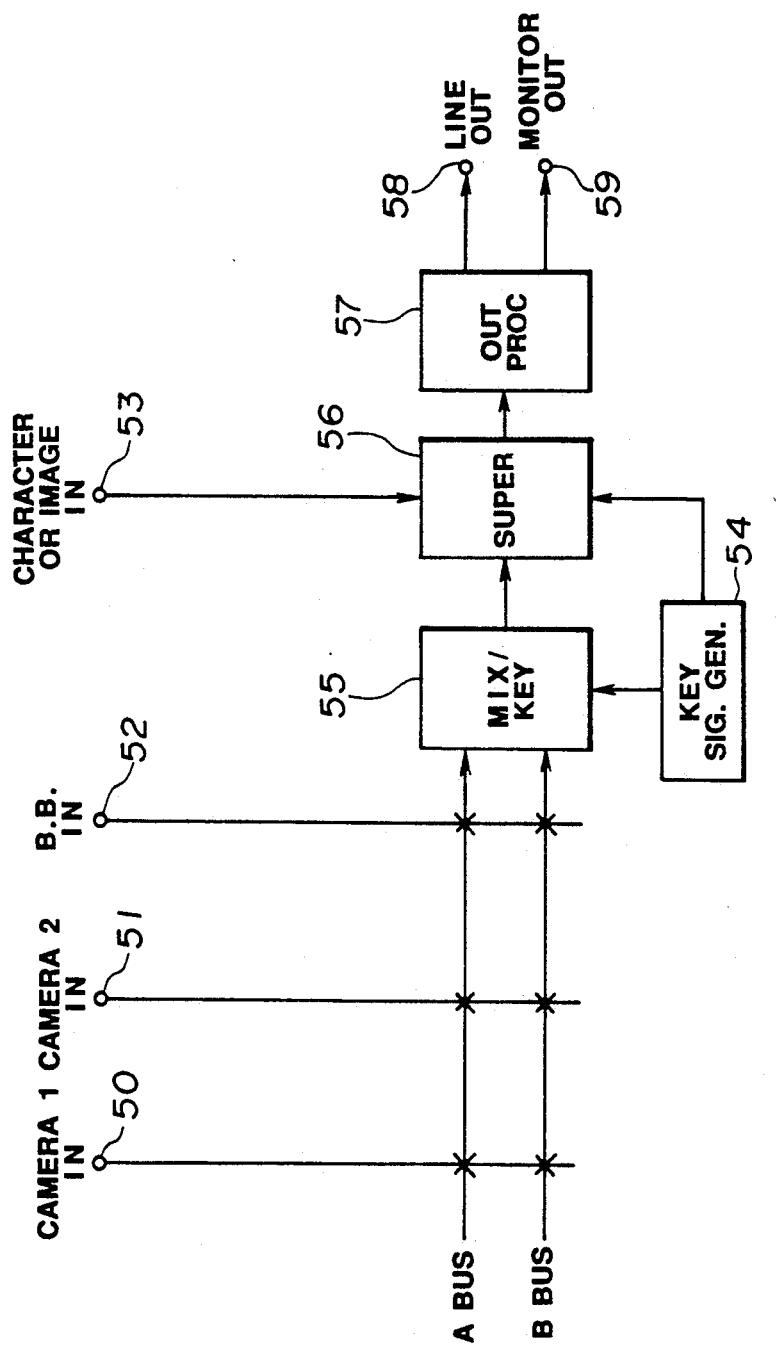
FIG. 1 is a generalized block diagram of a conventional video production switching apparatus.

An embodiment of a special effects apparatus in accordance with the present invention will now be described with reference to FIGS. 7 and 8. The special effects processing circuitry shown in FIG. 7 includes input terminals 15 and 16, a key processor 19, a video memory 24 and an output terminal 25. These elements respectively correspond to input terminals 30 and 31, key processor 32, video memory 37 and output terminal 38 of the circuitry of FIG. 2. Further, key processor 19 of FIG. 7 includes adders 21 and 23 and multipliers 20 and 22, which respectively correspond to adders 35 and 36 and multipliers 33 and 34 of key processor 32 of FIG. 2. As the interconnections among, and functions of, the aforesaid elements of the circuitry of FIG. 7 are similar to those of the corresponding elements of FIG. 2, these elements of FIG. 7 will not be described in detail.

Figure 7:
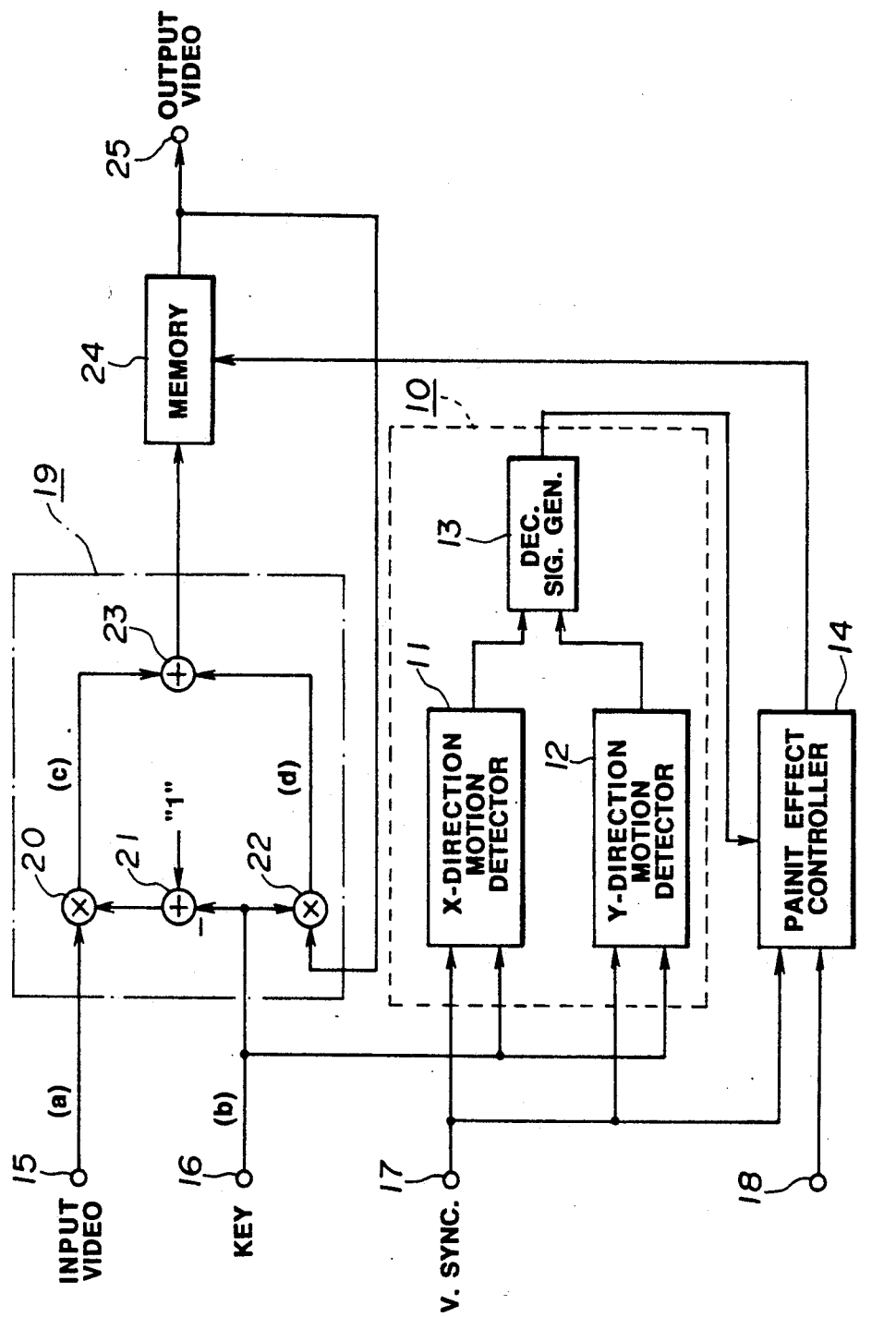
FIG. 7 is a circuit diagram of special effects processing circuitry according to the present invention.

The circuitry of FIG. 7 further includes a motion detection circuit 10 and a paint effect controller 14.

Motion detection circuit 10 includes an X-direction motion detection circuit 11, a Y-direction motion detection circuit 12 and a decision signal generating circuit 13. The key signals K applied to input terminal 16 are supplied to both X-direction motion detection circuit 11 and Y-direction motion detection circuit 12 The output signals of X-direction and Y-direction motion detection circuits 11 and 12 are provided to respective inputs of motion decision signal generating circuit 13, which in turn provides a motion detection signal to paint effect controller 14.

Vertical synchronization signals are provided via an input terminal 17 to the X-direction and Y-direction motion detection circuits 11 and 12 and to paint effect controller 14. Paint effect controller 14 also receives paint control signals via an input terminal 18. Paint effect controller 14 provides a control signal to video memory 24 and operates to inhibit storage in video memory 24 of the processed video signal output by adder 23 when there is no motion detected in the image pattern represented by key signal K.

Figure 2:
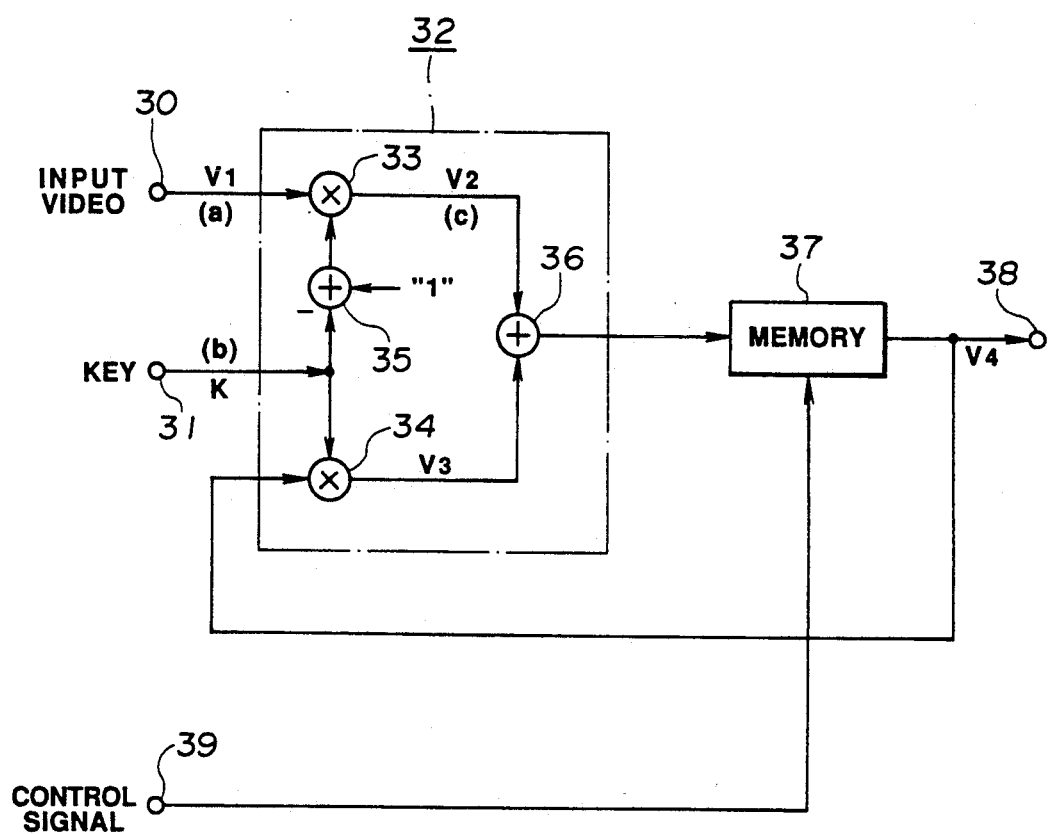
FIG. 2 is a circuit diagram of special effects processing circuitry that may be used in the production switching apparatus of FIG. 1 for creating complex special effects.
Figure 3:
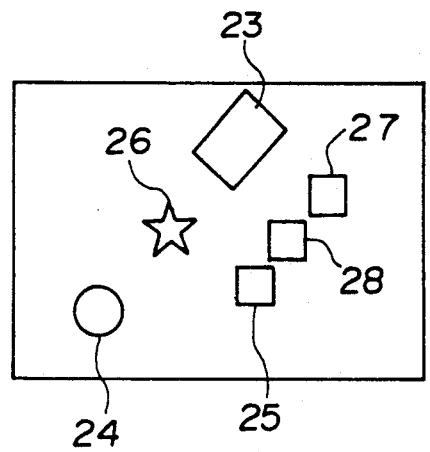
FIGS. 3, 4A, 4B, and 5A–5E are illustrations of special effects that may be created by using the circuitry of FIG. 2.
Figure 4A:
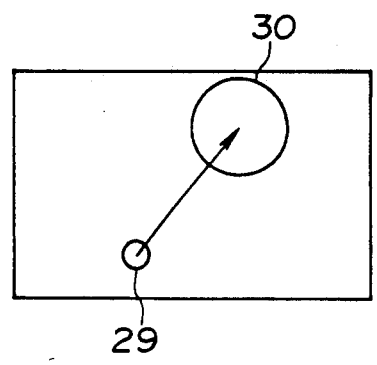
Figure 4B:
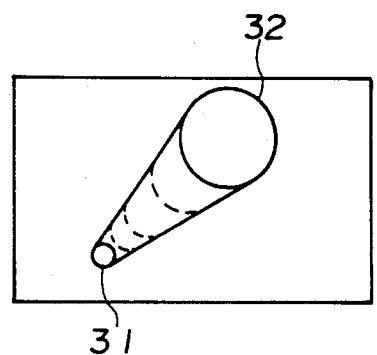
Figure 5A:
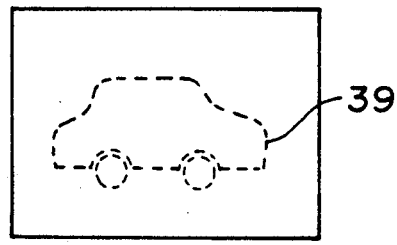
Figure 5B:
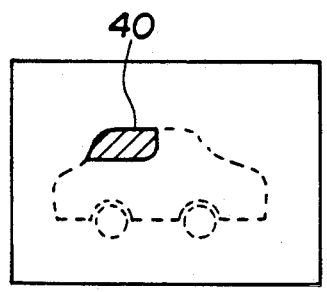
Figure 5C:
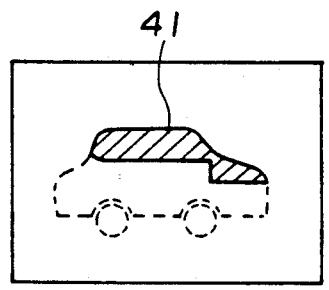
Figure 5D:
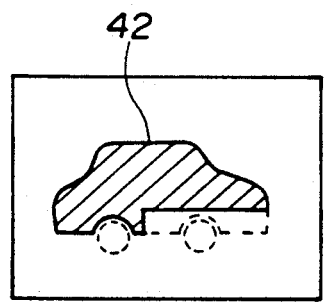
Figure 5E:
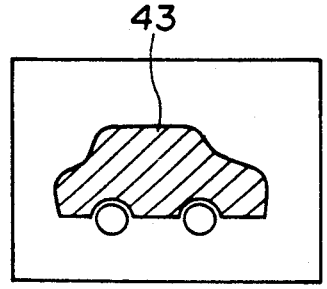

When motion is detected in the image pattern represented by key signal K, key processor 19 and video memory 24 operate in the manner described with respect to FIG. 2 so that the video image signal output from video memory 24 is fed back to key processor 19 for creation of special effects in multiple stages, or with moving and changing key signals, and optionally with the gradual transition between wiped and non-wiped portions of the image as previously described.

However, if no motion is detected in the image pattern represented by key signals K, then paint effect controller 14 controls memory 24 so that the creation of the special effects, and the writing of the output signal from adder 23 into memory 24 are stopped, and the data stored in video memory 24 is sequentially read out according to appropriate timing so that the output signal $V_4(1)$ as shown in FIG. 6d is repeatedly output. In this way, the gradual transitions between wiped and other portions of the image are maintained without the sharpening of those transitions that would otherwise be caused by repeated application of the key signal to the processed video signal.

Details of a particular embodiment of the circuitry shown in FIG. 7 will now be described with reference to FIG. 8, in which elements that correspond to those of FIG. 7 are identified by the same reference numerals.

Figure 8:
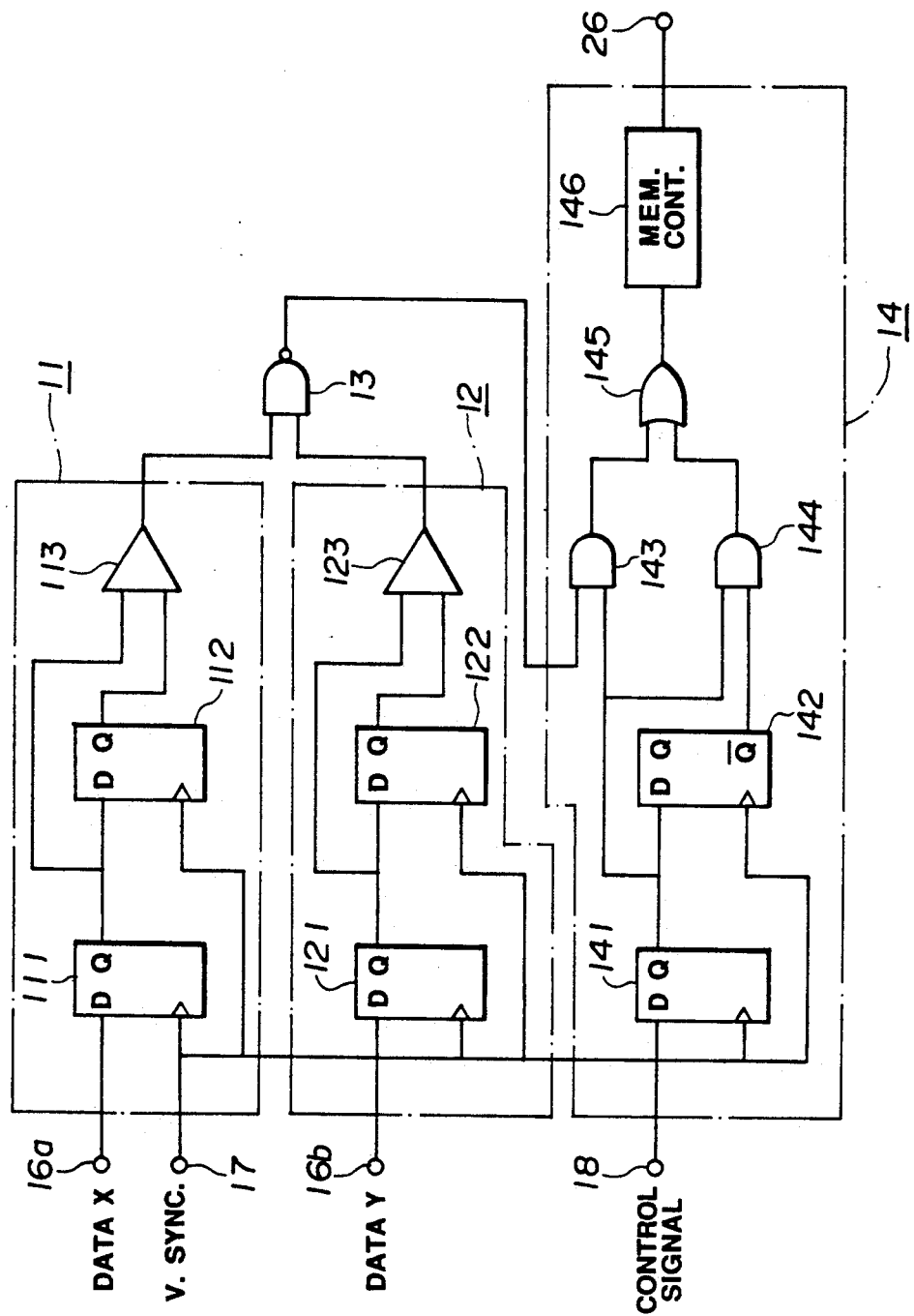
FIG. 8 is a more detailed circuit diagram of a portion of the circuitry of FIG. 7.

Referring to FIG. 8, X-direction motion detection circuit 11 includes D-latches 111 and 112 and a comparator 113 and Y-direction motion detection circuit 12 includes D-latches 121 and 122 and a comparator 123. The key signals K, received via input terminal 16, include X- and Y-direction coordinates for indicating the portion of the video image that is affected by the key signal. The X-component data is provided via an input terminal 16a to a D input terminal of D-latch 111 and the Y-direction component data is provided via an input terminal 16b to a D input terminal of D-latch 121. The vertical synchronization signal mentioned above is provided to respective clock inputs of D-latches 111, 112, 121 and 122.

The Q output of D-latch 111 is connected to a D input of D-latch 112 and also to one input of comparator 113. The other input of comparator 113 is connected to receive the Q output of D-latch 112. Similarly, in Y-direction motion detection circuit 12, the Q output of D-latch 121 is connected to a D input of D-latch 122 and also to one input of comparator 123. The other input of comparator 123 is connected to receive the Q output of D-latch 122. The outputs of comparators 113 and 123 are provided to respective inputs of 2-input NAND gate 13, which functions as the motion detection decision signal generating circuit 13 of FIG. 7.

Motion detection by the circuitry of FIG. 8 will now be described. Comparator 113 of X-direction motion detection circuit 11 outputs a "high" level if the respective outputs of D-latches 111 and 112 are the same, and otherwise outputs a "low" level. Since the vertical synchronizing signal is used as the clock for D-latches 111 and 112, the output of D-latch 112 is delayed by one vertical synchronization period with respect to the output of D-latch 111. If there is a change in the X-direction in the image pattern represented by the key signal K, then there will be a difference in the X-direction coordinate data from one vertical synchronization to the next. As a result, the respective outputs of the D-latches 111 and 112 will be different, so that comparator 113 will output a "low" level. If there is no motion in the X-direction during a vertical synchronization period, then the respective outputs of D-latches 111 and 112 will be the same, so that the level output from comparator 113 will be "high".

Y-direction motion detection circuit 12 operates in the same manner a X-direction motion detection circuit 11. In other words, if there is a change in position in the Y-direction of the image pattern represented by key signal K, then the respective outputs of D-latches 121 and 122 are different, so that the level output by comparator-123 is "low"; otherwise, the output of comparator 123 is "high".

If there is no motion in the image pattern represented by key signal K, both of the outputs of comparators 113 and 123 are "high" so that NAND gate 13 outputs a "low" level. If motion is detected in either or both of the X- and Y-directions, then one or both of the outputs of comparators 113 and 123 will be "low" so that the output of NAND gate 13 will be "high". In sum, if motion is detected, the output of NAND gate 13 is "high"; if there is no motion in the image pattern, then the output of NAND gate 13 is "low".

On the other hand, paint effect controller 14 includes D-latches 141 and 142, 2-input AND gates 143 and 144, an OR gate 145 and a video memory control circuit 146. A paint control signal is provided via input terminal 18 to a D input of D-latch 141. The Q output of D-latch 141 is provided in common to a D input of D-latch 142 and to respective inputs of AND gates 143 and 144. The other input of AND gate 143 receives the motion detection signal output from NAND gate 13, while the other input of AND gate 144 receives a $\overline{Q}$ output from D-latch 142. The outputs of AND gates 143 and 144 are provided to respective inputs of 2-input OR gate 145. The output of OR gate 145 is provided as a control signal to memory controller 146, which, in turn, outputs control signals for video memory 24 (FIG. 7) via an output terminal 26. D-latches 141 and 142, like the previously mentioned D-latches 111, 112, 121 and 122, are clocked by the vertical synchronizing signal received at input terminal 17.

Memory controller 146 operates so that the video memory 24 stores the processed video signal output by adder 23 when the output of OR gate 145 is "high", and memory controller 146 prevents video memory 124 from storing the processed video signal when the output of OR gate 145 is "low".

The level of the signal output by OR gate 145 depends on the signals output by AND gates 143 and 144. The output of AND gate 143 is "high" when both the control signal supplied at input terminal 18 and the motion detection signal output by NAND gate 13 are "high" (i.e., when motion has been detected by motion detector 10) and is "low" at other times. The signal output by AND gate 144 is "high" for one vertical synchronization period after a transition of the paint control signal from "low" to "high" and is "low" at other times. Consequently, if the paint control signal is "high" and motion in the image pattern of key signal K has been detected, the output of AND gate 143 is "high", and the output of OR gate 145 is "high" so that the processed video signal is stored in video memory 24. At other times, i.e, if the paint control signal is "low", or if no motion is detected in the image pattern represented by key signal K, the output of OR gate 145 is "low", except that the output of OR gate 145 is "high" for one vertical synchronization period after the paint control signal has been changed from "low" to "high". During such a vertical synchronization period, the output of AND gate 144 is "high" so that the output of OR gate 145 is also "high" and the processed video signal is stored in video memory 24 regardless of whether motion was detected in the image pattern.

To summarize, the circuitry shown in FIGS. 7 and 8 operates to inhibit repeated application of the key signal K to the input video signal V₁ at times when the image pattern represented by key signal K is not moving. This prevents the undesirable sharpening of the edge transition between wiped and nonwiped areas of the video image, thus preserving the "painted" or gradual transition special effects produced by the circuitry of FIG. 2 even when the image pattern of the key signal is stationary.

Although the circuit of FIG. 7 has an inverted key signal applied at multiplier 20 and a noninverted key signal applied at multiplier 22, it should be noted that, as an alternative, a noninverted key signal could be applied to multiplier 20 and an inverted key signal applied to multiplier 22.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A special effects apparatus for processing an input video signal in accordance with a key signal that represents an image pattern, said apparatus comprising:
    processing means receiving said input video signal and said key signal for processing said input video signal in accordance with said key signal and for outputting a processed video signal;
    storage means for storing said processed video signal output from said processing means;
    means for feeding back said processed video signal from said storage means to said processing means for further processing of said processed video signal in accordance with said key signal and said input video signal;
    motion detecting means receiving said key signal for detecting motion of the image pattern represented by said key signal; and
    control means responsive to said motion detecting means for selectively preventing said storage means from storing the processed video signal output from the processing means.

2. A special effects apparatus according to claim 1; wherein said control means prevents said storage means from storing said processed video signal when said motion detecting means does not detect motion in said image pattern represented by said key signal.

3. A special effects apparatus according to claim 1; wherein said motion detecting means comprises:
    first means for detecting changes in position of said image pattern in a horizontal direction;
    second means for detecting changes in position of said image pattern in a vertical direction; and
    means responsive to said first and second means for supplying a motion detection signal to said control means.

4. A special effects apparatus according to claim 1; wherein said processing means comprises:
    means for supplying a first signal that has a level dependent on said key signal;
    first multiplying means for multiplying said input video signal by said first signal;
    means for supplying a second signal that has a level dependent on said key signal;
    second multiplying means for multiplying said processed video signal fed back from said storage means by said second signal; and
    adding means for adding respective output signals of said first and second multiplying means and for outputting a resulting sum as said processed video signal.

5. A special effects apparatus according to claim 4; wherein one of said first and second signals is an inversion of the other of said first and second signals.

* * * * *